United States Patent Office 3,345,372
Patented Oct. 3, 1967

3,345,372
SUBSTITUTED N-CARBAMYLPYRAZINE-CARBOXAMIDES
John William Hanifin, Jr., Suffern, N.Y., Rosemary Angela Capuzzi, Cliffside Park, N.J., and Elliott Cohen, Pearl River, N.Y., assignors to American Cyanamid Company, Stamford, Conn., a corporation of Maine
No Drawing. Filed Mar. 24, 1967, Ser. No. 625,619
10 Claims. (Cl. 260—250)

ABSTRACT OF THE DISCLOSURE

This disclosure describes compounds of the class of N-carbamylpyrazinecarboxamides useful as diuretics.

Brief summary of the invention

This invention relates to new derivatives of N-carbamylpyrazinecarboxamide and, more particularly, is concerned with novel compounds which may be represented by the following general formula:

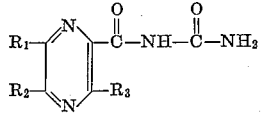

wherein $R_1$ is hydrogen or halogen, $R_2$ is hydrogen, amino, mono(lower alkyl)amino or di(lower alkyl)amino and $R_3$ is hydrogen, amino, mono(lower alkyl)amino or di(lower alkyl)amino. Suitable lower alkyl groups contemplated by the present invention are those having up to about six carbon atoms such as, for example, methyl, ethyl, n-propyl, isopropyl, n-butyl, isobutyl, tert.-butyl, n-amyl, n-hexyl, etc. Halogen is exemplified by chloro, bromo and iodo.

Detailed description of the invention

The novel N-carbamylpyrazinecarboxamide derivatives of the present invention are, in general, white to yellow crystalline solids having characteristic melting points and absorption spectra. They are relatively insoluble in water, benzene, toluene, diethyl ether and petroleum ether but are relatively soluble in methanol, ethanol, ethyl acetate, dimehtylformamide and the like. The infrared and ultraviolet absorption spectra are characteristic of the novel compounds of the present invention and provide a preferred means of distinguishing and identifying them.

The novel compounds of the present invention are capable of forming pharmaceutically acceptable acid-addition salts with a variety of organic and inorganic acids. Such salts may be readily prepared by the simple addition of acid to the N-carbamylpyrazinecarboxamide derivative in an inert organic solvent such as methanol or ethanol. These salts include those prepared from acids such as hydrochloric, hydrobromic, hydriodic, sulfuric, phosphoric, sulfamic, tartaric, glycolic, citric, maleic, succinic, acetic, ascorbic, and the like. For purposes of this invention, the free bases are equivalent to their nontoxic acid-addition salts.

The compounds of this invention are useful because they possess diuretic and natriuretic properties. They differ from most of the known effective diuretic agents, however, in that the compounds of this invention selectively enhance the excretion of sodium ions without causing an increase in excretion of potassium ions. The potassium loss, which is caused by known diuretics, often results in a severe muscular weakness. Since the compounds of this invention are essentially free of this potassium depletion, they have this decided advantage as diuretics. As diuretic agents, they can be used for the treatment of edema, hypertension and other diseases known to be responsive to this therapy.

It has also been found as another feature of this invention that when coadministered with other diuretic agents known to enhance the elimination of potassium ions along with sodium ions, the novel N-carbamylpyrazinecarboxamide derivatives of this invention will reduce the excretion of potassium ions and thus overcome this undesirable property of other diuretic agents. The compounds of this invention, therefore, are useful in combination with other classes of diuretic agents to prevent the loss of potassium which the other diuretics otherwise would cause to be eliminated. In addition, the compounds of this invention are useful by themselves as diuretic and/or saluretic agents.

The novel compounds of the present invention may be incorporated with various suitable pharmaceutical carriers in dosage forms which are of value for administration to mammals. Essentially any inert pharmaceutical carrier may be used, that is, any substance which is useful for the preapration of dosage form and which does not tend to inactivate the diuretic substance. Thus, these novel compounds may be incorporated into capsules with various inert materials or they may be converted into tablets by incorporation with certain tableting agents such as gums, either natural or synthetic, sweetening agents, coating agents, and so forth. Alternatively, these novel compounds may be utilized in the form of injectable preparations. For administration by the intramuscular route, the medium for the diuretic compounds may be water, saline, nontoxic vegetable oils, and other materials of this nature. For administration by the intravenous route, care must be taken that a clear solution in water, saline or glucose solution is prepared. Certain other dosage forms, such as suppositories, may be prepared with a suitable nonhydrophilic base such as cocoa butter and substances of this nature. The novel compounds of this invention may be advantageously administered at a dosage range of from about 5 mg./day to about 750 mg./day, preferably in subdivided amounts on a 2 to 4 times a day regimen.

The novel compounds of the present invention may be readily prepared from an appropriately substituted pyrazinecarboxylic ester in accordance with the following reaction scheme:

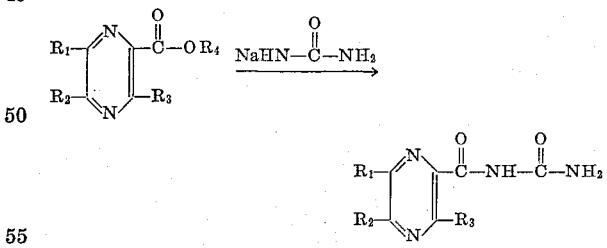

wherein $R_1$, $R_2$ and $R_3$ are as hereinabove defined and $R_4$ is a lower alkyl group such as methyl, ethyl, isopropyl, n-butyl, and the like. This reaction may be advantageously carried out in a suitable inert solvent such as chloroform, toluene, tetrahydrofuran, and the like although dimethylformamide is preferred. Customarily, the sodium urea is first formed by reacting urea with sodium hydride in a suitable inert solvent, preferably dimethylformamide, and at a reduced temperature, preferably from about $-10°$ C. to about $50°$ C. The appropriately substituted pyrazineacrboxylic ester, either directly or in solution, may then be added to the solution of the sodium urea without intermediate isolation of the latter. This final reaction is also carried out at a reduced temperature, generally from about $-10°$ C. to about $70°$ C. Formation of the sodium urea generally takes place rapidly, usually within a few minutes, whereas a longer time is ordinarily required for reaction of the sodium urea with the pyrazinecarboxylic ester, generally from about 30 to about 60 minutes. The final products are isolated from the reaction mixtures and purified by conventional means well known to those skilled in the art.

Typical compounds of the present invention which may be thus prepared are, for example, N-carbamyl-6-chloropyrazinecarboxamide, N - carbamyl-5-aminopyrazinecarboxamide, N-carbamyl-3,5-diaminopyrazinecarboxamide, N - carbamyl-3-amino-6-bromopyrazinecarboxamide, N-carbamyl-5-amino-6-iodopyrazinecarboxamide, N - carbamyl-3-methylamino - 6 - chloropyrazinecarboxamide, N-carbamyl-5-ethylamino - 6 - bromopyrazinecarboxamide, N-carbamyl-3-methylamino-5-isopropylamino - 6 - iodopyrazinecarboxamide, N - carbamyl-3-dimethylamino-6-chloropyrazinecarboxamide, N-carbamyl-5-diethylamino-6 - bromopyrazinecarboxamide, N-carbamyl-3-dimethylamino-5-diethylamino - 6 - iodopyrazinecarboxamide, N-carbamyl-3-dimethylaminopyrazinecarboxamide, N - carbamyl-5-diethylaminopyrazinecarboxamide, N-carbamyl-3,5 - di(dimethylamino)pyrazinecarboxamide, and the like.

The invention will be described in greater detail in conjunction with the following specific examples.

EXAMPLE 1

*Preparation of N-carbamylpyrazinecarboxamide*

To 5 ml. of dry dimethylformamide was added 0.48 g. of urea. The solid dissolved upon stirring for a few minutes. To the stirred solution was then added 0.35 g. of sodium hydride. This was left to stir for one hour. A white solid precipitate formed in the flask as the sodium hydride reacted. Then 1.65 g. (0.012 mole) of methyl pyrazinate in 2 ml. of dimethylformamide was added dropwise to the mixture cooled to — 15° C. The cooled solution was left to stir for one hour. It was then poured onto 25 ml. of ice water, made acidic (pH 5) with acetic acid. A white precipitate formed which was filtered and dried. The weight of the crude product was 0.350 g. This material was crystallized from water to yield 0.150 g. of product, M.P. 210–12° C.

EXAMPLE 2

*Preparation of methyl 3-aminopyrazinecarboxylate*

To 2580 ml. of methanol in a 5 l. round-bottomed, three-necked flask equipped with an ice bath, stirred and thermometer was added 500 g. (3.60 mole) of 3-aminopyrazinecarboxylic acid. To this stirred suspension was added 730 ml. of cool, sulfuric acid, maintaining a temperature of 10–15° C. The reaction mixture was stirred without further external cooling for 64 hours. The dark solution was poured into 450 ml. of water and the pH adjusted to 8–9 with 1620 g. of sodium bicarbonate. The precipitated product was collected by filtration, washed with water and slurried in 7.5 l. of hot water, chilled and filtered. 374 g. (68%) of product, M.P. 173–8° C., was obtained after air drying.

EXAMPLE 3

*Preparation of N-carbamyl-3-aminopyrazinecarboxamide*

To 10 ml. of dry dimethylformamide was added 0.9 g. (0.15 mole) of urea which dissolved immediately. To this stirred solution cooled to —15° C. was added 0.66 g. (0.15 mole) of sodium hydride. This mixture was stirred for 1 hour until the sodium hydride had all reacted to form the monosodium urea. To this suspension at —15° C. was added 3.0 g. (0.0195 mole) of methyl 3-aminopyrazinecarboxylate in 30 ml. of dimethylformamide. The cooled solution was left to stir for about 20 minutes and then poured into ice water made acidic (pH 5) with acetic acid. This solution was filtered and the yellow filtrate stripped to dryness. To the residue was added a minimum of ice water to yield 550 mg. of a dark yellow precipitate. This material was then dissolved in 50 ml. of hot water, filtered, and stripped down to a minimum volume on the rotating evaporator. A yellow solid precipitated from solution. This solid was washed with methanol and recrystallized from water to give 100 mg. of product M.P. 285° C. dec.

EXAMPLE 4

*Preparation of methyl 3-amino-6-chloropyrazinecarboxylate*

In a two liter three necked flask equipped with a thermometer, gas inlet tube and mechanical stirrer was added 20.0 g. (0.195 mole) of methyl 3-aminopyrazinecarboxylate, 1045 ml. of water, and 242 ml. of acetic acid. This mixture was heated until solution occurred (40° C.). This solution was cooled to 25° C. and chlorine gas was bubbled through until the reaction had gained 57 g. The yellow precipitate was filtered, washed with cold water, and stirred at 25° C. with a solution of 50 g. of sodium bisulfite in 330 ml. of water for 90 minutes. The product was filtered, washed with water and isopropyl alcohol to give 15.7 g. of product, M.P. 154–157° C.

EXAMPLE 5

*Preparation of N-carbamyl-3-amino-6-chloropyrazinecarboxamide*

To 15 ml. of dry dimethylformamide was added 1.3 g. (0.022 mole) of urea which dissolved immediately. To this solution cooled to —15° C. was added 0.95 g. of sodium hydride. This mixture was left to stir for 4½ hours. To the cooled suspension was then added 1.0 g. (0.0054 mole) of methyl 3-amino-6-chloropyrazinecarboxylate. The cooled solution was left to stir for 1 hour and it was then poured into 25 g. of ice water which was acidified with acetic acid (pH 5). The solution was then stripped nearly to dryness on the rotating evaporator. Water was added and a solid precipitated. The brown precipitate was dissolved in hot ethanol, filtered, and the ethanol stripped off. The residue was then recrystallized from methanol twice to give 180 mg. of product, M.P. 240° C.

EXAMPLE 6

*Preparation of methyl 3-amino-5-dimethylamino-6-chloropyrazinecarboxylate*

To a stirred mixture of 2.0 g. (0.009 mole) of methyl-3-amino-5,6-dichloropyrazinecarboxylate in 12.4 ml. of 2-propanol was added 2.25 g. (0.050 mole) of dimethylamine in 24 ml. of 2-propanol. The mixture was refluxed for 60 minutes and then cooled in an ice bath. The redbrown crystalline product that separated was filtered and dried to give 1.75 g. (84%) of product. This material was recrystalized from methanol to give 1.45 g. of product, M.P. 142–4° C.

EXAMPLE 7

*Preparation of N-carbamyl-3-amino-5-dimethylamino-6-chloropyrazinecarboxamide*

To 15 ml. of dry dimethylformamide was added 1.2 g. (0.02 mole) of urea. Upon cooling, 0.94 g. (0.02 mole) of sodium hydride (50% in oil) was added. The mixture was left to stir for 2½ hours. To the cooled mixture was then added 1.13 g. (0.005 mole) of methyl 3-amino-5-dimethylamino-6-chloropyrazinecarboxylate. This was left to stir for 2 hours. It was then poured onto 40 g. of ice which had been acidified to pH 6.4 with acetic acid. The solution which resulted was then stripped to near dryness, water added, and then cooled. The product which separated out upon cooling was filtered and dried. This brown solid was dissolved in a warm 6 N hydrochloric acid solution, filtered, and then precipitated with sodium hydroxide. The material was then recrystallized from methanol to give 700 mg. of product, M.P. 209-211° C.

EXAMPLE 8

*Preparation of methyl 3-amino-5-methylisopropylamino-6-chloropyrazinecarboxylate*

To a stirred suspension of 1.24 g. (0.0056 mole) of methyl 3-amino-5,6-dichloropyrazinecarboxylate in 7.7 ml. of 2-propanol was added a solution of 2.3 g. (0.031 mole) of methylisopropylamine in 13 ml. of 2-propanol. The mixture was heated at reflux for 60 minutes and then cooled in an ice bath. The solution was stripped to an oily residue in the rotating evaporator. This residue was then crystallized from 2-propanol to give 1.05 g. of the desired product, M.P. 73-75° C.

EXAMPLE 9

*Preparation of N-carbamyl-3-amino-5-methylisopropyl-amino-6-chloropyrazinecarboxamide*

To 15 ml. of dry dimethylformamide was added 0.94 g. (0.016 mole) of urea. Upon cooling, 0.75 g. (0.016 mole) of sodium hydride (50% in oil) was added. The mixture was left to stir for 2½ hours. To the cooled mixture was then added 1.0 g. (0.0039 mole) of methyl 3-amino-5-methylisopropylamino-6-chloropyrazinecarboxylate. This was left to stir for 2 hours. It was then poured onto 25 g. of ice which had been acidified to pH 8.0 with acetic acid. The solution was then stripped to near dryness, water added, and then cooled. The product which separated out upon cooling was filtered and dried. This brown solid was dissolved in warm 6 N hydrochloric acid solution, filtered, and then precipitated with sodium hydroxide. The material was then recrystallized from methanol to give 450 mg. of product, M.P. 196-198° C.

What is claimed is:

1. A compound selected from the group consisting of those of the formula:

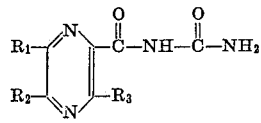

wherein $R_1$ is selected from the group consisting of hydrogen and halogen; $R_2$ is selected from the group consisting of hydrogen, amino, mono(lower alkyl)amino and di(lower alkyl)-amino and $R_3$ is selected from the group consisting of hydrogen, amino, mono(lower alkyl)amino and di(lower alkyl)amino; and the non-toxic pharmaceutically acceptable acid-addition salts thereof.

2. A compound according to claim 1 wherein $R_1$, $R_2$ and $R_3$ are hydrogen.

3. A compound according to claim 1 wherein $R_1$ and $R_2$ are hydrogen and $R_3$ is amino.

4. A compound according to claim 1 wherein $R_1$ is chloro, $R_2$ is hydrogen and $R_3$ is amino.

5. A compound according to claim 1 wherein $R_1$ is chloro and $R_2$ and $R_3$ are amino.

6. A compound according to claim 1 wherein $R_1$ is chloro, $R_2$ is methylisopropylamino and $R_3$ is amino.

7. A compound according to claim 1 wherein $R_1$ is chloro, $R_2$ is dimethylamino and $R_3$ is amino.

8. A compound according to claim 1 wherein $R_1$ is hydrogen and $R_2$ and $R_3$ are amino.

9. A compound according to claim 1 wherein $R_1$ is chloro, $R_2$ is methylamino and $R_3$ is amino.

10. A compound according to claim 1 wherein $R_1$ is chloro, $R_2$ is methylamino and $R_3$ is amino.

References Cited

UNITED STATES PATENTS 3,108,099   10/1963   Felder et al. _____ 260—250

NICHOLAS S. RIZZO, *Primary Examiner.*

PO-1050
(5/69)

UNITED STATES PATENT OFFICE
CERTIFICATE OF CORRECTION

Patent No. 3,345,372     Dated   October 3, 1967

Inventor(s) John William Hanifin, Jr., Rosemary Angela Capuzzi, and Elliott Cohen It is certified that error appears in the above-identified patent and that said Letters Patent are hereby corrected as shown below:

Column 3, line 56, "450 ml." should read -- 4500 ml. --. Column 6, line 34 (Claim 10, line 2 thereof), "methylamino" should read -- methylethylamino --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents